United States Patent
Brandhofer et al.

[11] Patent Number: 6,027,542
[45] Date of Patent: Feb. 22, 2000

[54] FILTER CARTRIDGE

[75] Inventors: Andreas Brandhofer, Birkenau; Thomas Schroth, Bohenheim; Jörgen Knudsen, Angelbachtal; Wolfgang Schmidt, Laudenbach, all of Germany

[73] Assignee: Firma Carl Freudenberg, Weinheim, Germany

[21] Appl. No.: 09/160,667

[22] Filed: Sep. 25, 1998

[30] Foreign Application Priority Data

Sep. 25, 1997 [DE] Germany ............ 197 42 271

[51] Int. Cl.$^7$ .................................. B01D 46/52
[52] U.S. Cl. .................. 55/490; 55/497; 55/502; 55/508; 55/511; 55/DIG. 31
[58] Field of Search ............ 55/497, 505, 508, 55/511, 517, DIG. 31, 502, 490

[56] References Cited

U.S. PATENT DOCUMENTS

| | | |
|---|---|---|
| 3,712,033 | 1/1973 | Growholt ............... 55/505 |
| 4,372,853 | 2/1983 | Mayfield ................ 55/505 |
| 4,461,205 | 7/1984 | Shuler .................. 55/505 |
| 5,531,892 | 7/1996 | Duffy ................ 55/DIG. 31 |
| 5,725,624 | 3/1998 | Ernst et al. ............. 55/511 |
| 5,772,713 | 6/1998 | Salinas et al. ....... 55/DIG. 31 |
| 5,858,041 | 1/1999 | Luetkemeyer ............ 55/505 |

*Primary Examiner*—David A. Simmons
*Assistant Examiner*—Minh-Chau T. Pham
*Attorney, Agent, or Firm*—Kenyon & Kenyon

[57] ABSTRACT

A filter cartridge has a frame made of tough material, which sealingly surrounds an accordion fold pack on its circumferential side. The frame is made of assemblable, plate-shaped frame elements and has, on the circumferential side along the lower and/or upper edge of the frame, a tongue, the tongue being insertable in a latticed holder having a U-shaped profile. A viscous joining compound is used to affix the tongue in place. The tongue is formed by strip-shaped tongue elements, each tongue element being joined to a frame element, wherein the adjacent ends of the tongue elements are sealingly fastened to each other by connecting corner pieces.

14 Claims, 4 Drawing Sheets

FILTER CARTRIDGE

BACKGROUND OF THE INVENTION

The invention relates to a filter cartridge of the type including a frame made of tough, rigid material that sealingly surrounds an accordion fold pack on its circumferential side. The frame is composed of plate-shaped frame elements, capable of assembly. The frame is provided, on the circumferential side along its upper and/or lower edges with a tongue that can be inserted into a latticed holder having a U-shaped profile that can be affixed therein by a viscous jointing compound.

Such a filter cartridge is known and used, for example, as an air filter in clean rooms in which microchips are manufactured. In this context, the tongue of the known filter cartridge is designed in one piece and, subject to the conditions of manufacture, in planar form, the planar tongue being adjusted to the shape of the frame. The two tongue ends, adjacent to each other, are pressed onto each other and sealingly bonded. One disadvantage of the design approach in the above-mentioned filter cartridge lies in the difficulties attendant to the manufacturing process by which the tongue is coated or anodized. A further disadvantage of the known design is that the tongue ends, which are glued to each other in the area of their junction, have only slight mechanical strength. The bond between the two ends can easily be destroyed as the filter cartridge is mounted into the holder.

SUMMARY OF THE INVENTION

The present invention provides an improved filter cartridge of the type set forth above, in which the tongue is anodized or coated and presents ends which can be sealed with an enhanced degree of durability and tightness.

The tongue of the present invention is made up of strip-shaped tongue elements. Each tongue element is joined to a frame element, and adjacent ends of the tongue elements are sealingly fastened to each other by connecting corner pieces.

In the filter cartridge of the present invention, the tongue is not bent in order to extend, band-like, along the entire frame. Instead it is composed of a plurality of entirely planar tongue elements which can, if desired, be coated or anodized, which is advantageous particularly in view of the use of filter cartridges in clean rooms. By using the connecting corner pieces to join the tongue-element ends, adjacent to each other, great mechanical strength is attained in this area, equaling the strength of a bent tongue which is designed in one piece.

In accordance with a first embodiment, the frame elements and the tongue elements can be designed in one piece, integrally formed, made of the same material. This design approach helps simplify both the manufacture and assembly of the filter cartridge, since no separate assembly of the tongue elements onto the frame elements is necessary. A further advantage of this one-piece design of the frame elements and the tongue via the manufacturing processes is that it automatically provides a sealing connection between the two parts.

According to another embodiment, the tongue elements can be produced separately from the frame elements and then be sealingly joined to the lower and/or upper edges of the frame elements. The lower and/or upper edge can have an open groove opposite the accordion fold pack, the tongue elements being arranged sealingly in the grooves. The grooves can contain a tough molding compound (e.g., polyurethane) for binding the tongue elements to the frame. The tough molding compound sealingly surrounds the side of the tongue elements that face the frame elements. One advantage of this design approach is that the frame elements and the tongue elements can be combined with each other according to the unit construction principle. For example, a frame can be combined with tongues of varying heights, to form the entire filter cartridge such that it can be installed in various holders.

The connecting corner pieces can have an essentially U-shaped profile and they substantially wrap around the tongue elements on the side facing away from the frame elements. A consequence of this design is the ends of tongue elements, adjacent to each other, can be spatially coordinated in a particularly simple way.

The connecting corner pieces preferably are made of a polymer material and are at least partially filled with a jointing compound. The jointing compound with which the connecting corner pieces are filled can be the same jointing compound that is used between the holder and the tongue. In this context, the holder can have a lattice form. The tongue elements are inserted into the connecting corner pieces filled with jointing compound and, in the area of their ends, adjacent to each other, are pushed in the direction of each other. The ends are sealingly bonded to each other by the jointing compound, which retains its elasticity during the entire service life of the filter cartridge.

According to another embodiment, the connecting corner pieces can be first slipped onto the ends of the tongue elements and, subsequently, a jointing compound injected, sealingly bonding to each other the tongue element ends situated within the connecting corner pieces.

The connecting corner pieces can have varying leg lengths, the shorter leg resting on the outer boundary wall of the groove, facing away from the accordion fold pack. This arrangement can serve as a limit stop for positioning the tongue element in the groove of the frame element, the longer leg extending into the groove and being sealingly surrounded by the molding compound. For filter cartridge designs in which the tongue elements are manufactured separately from the frame elements and are sealingly joined to them, this embodiment is of particular advantage in that the spatial coordination of the tongue elements with respect to the frame elements is particularly precise. In addition, the design of the connecting corner pieces makes it certain that the longer leg always extends into the groove and, in that way, is always sealingly surrounded by the molding compound. Due to the shorter leg, which is designed as a limit stop and is situated on the outside boundary wall of the groove, errors in assembling the filter cartridge are kept to a minimum.

The tongue elements are contacted by the legs of the connecting corner pieces under elastic prestressing. If the connecting corner pieces are made of polymer material, the material shrinks, in conformity to manufacturing processes, during solidifying and cooling. As a result of the shrinkage, the legs are joined to each other at their sides facing each other. For assembly with the tongue elements, the legs are elastically deformed and are pulled apart to the point that the connecting corner pieces can be slid onto the tongue element ends situated adjacent to each other. As a result of the elastic prestressing with which the connecting corner pieces contact the tongue elements, it is advantageous that the tongue elements and the connecting corner pieces form a preassembled unit. The entire tongue is held together by the connecting corner pieces, the preassembleable unit, designed in this way, being inserted into the groove of the frame elements and then sealingly joined to the frame by the molding compound.

If the filter cartridge is used as an air filter in clean rooms, it is advantageous that the tongue elements be made of anodized aluminum. The frame is also preferably made of anodized aluminum. The anodizing of the aluminum is necessary, in order to assure that, over a particularly long service life, fine dust particles produced by oxidation cannot separate off (aluminum oxide adheres rather strongly to the underlying aluminum). This feature is of particular in a production area such as for the processing of semiconductors, where extremely strict safety standards must be maintained.

BRIEF DESCRIPTION OF THE DRAWINGS

In the following, the filter cartridge according to the present invention is explained in greater detail on the basis of the Figures. They show, in schematic representation.

DETAILED DESCRIPTION

Figure 1:
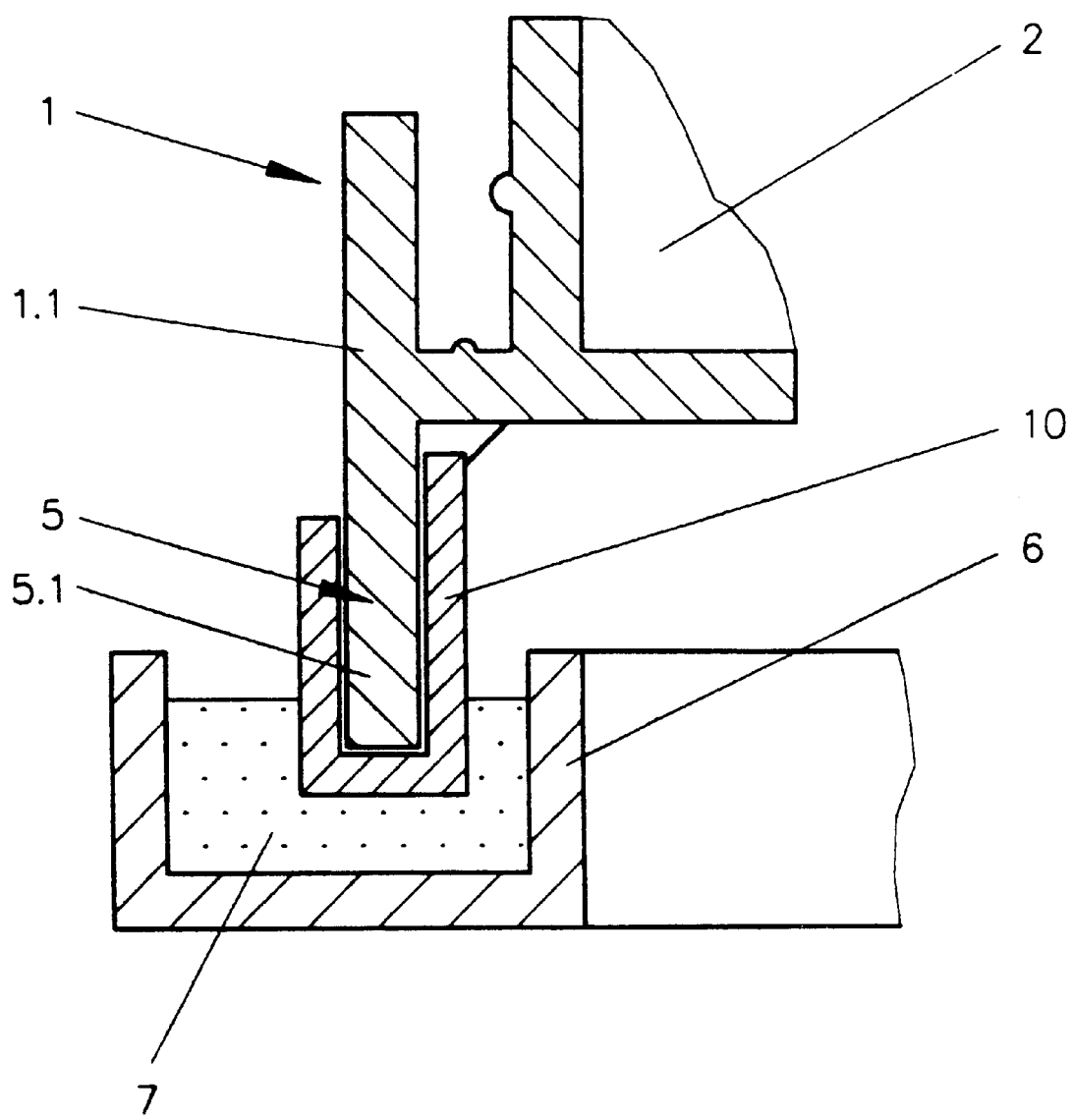
FIG. 1 shows a cross section of an exemplary embodiment of a filter cartridge according to the present invention in the area of a corner, for a filter cartridge that can be used as an air filter in the ceiling of a clean room and which is arranged on a lattice-shaped holder. The frame elements and the tongue elements are designed in a single part, integrally formed, and are made of the same material.

In FIG. 1, a filter cartridge is shown which is arranged on a latticed holder 6 and which forms part of a ceiling paneling leading to a clean air space 18. The filter cartridge essentially includes an accordion fold pack 2, which is surrounded by a frame 1, frame 1 being provided with a tongue 5 on the side facing holder 6. In this exemplary embodiment, frame 1 and tongue 5 are made of anodized aluminum, and the accordion fold pack 2 is made of a non-woven fabric.

In this embodiment, frame 1 includes four assembleable, plate-shaped frame elements 1.1, . . . , 1.4, which are arranged at right angles to each other and sealingly surround the accordion fold pack on the circumferential side. Frame elements 1.1, . . . , 1.4 and tongue elements 5.1, . . . , 5.4 are designed in one piece, integrally formed, and made of the same material. Adjacent ends 8,9 of tongue elements 5.1, . . . 5.4 are sealingly joined together by connecting corner pieces 10.

In the embodiment illustrated in FIG. 2, the filter cartridge essentially corresponds to the filter cartridge shown in FIG. 1, differing from that embodiment in that frame elements 1.1, . . . , 1.4 (there will typically be four such elements) and tongue elements 5.1, . . . , 5.4 are manufactured separately and are subsequently sealingly joined to each other. In this embodiment, the lower edge 3 of frame elements 1.1, . . . , 1.4 is provided with an open groove 11 opposite accordion fold pack 2. Tongue elements 5.1, . . . , 5.4 extending into groove 11 on the side facing accordion fold pack 2 are sealingly joined, by a molding compound situated in groove 11, to frame elements 1.1, . . . , 1.4.

Figure 2:
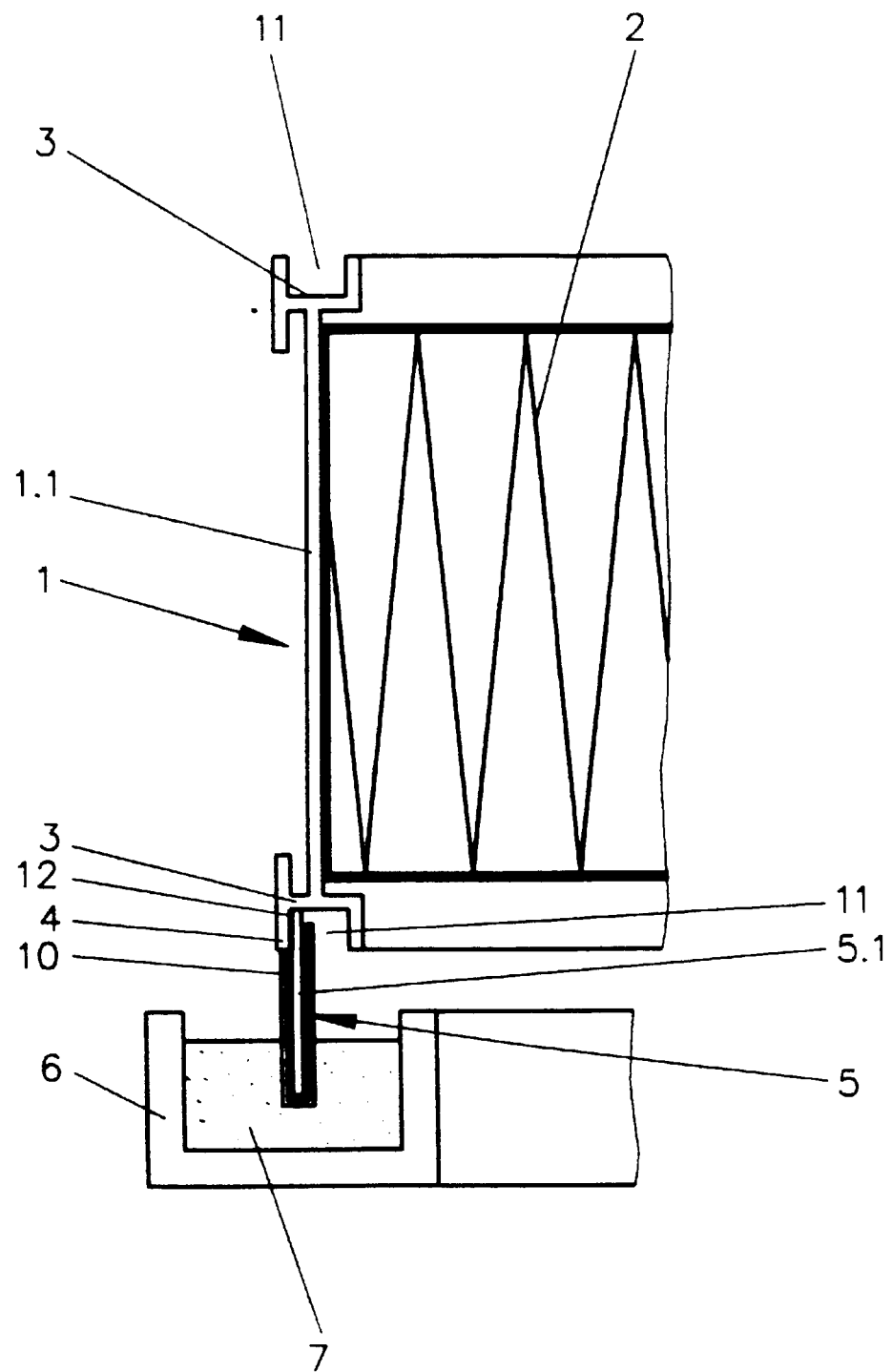
FIG. 2 shows an embodiment of a filter cartridge, similar to the filter cartridge according to FIG. 1, but in which the frame elements and the tongue elements are produced separately and then are sealingly joined to each other.

In FIGS. 1 and 2, tongue 5, made up of tongue elements 5.1, . . . , 5.4, is held within the latticed, essentially U-shaped holder 6. The U-shaped cross section is filled with a pasty jointing compound 7, which sealingly surrounds tongue 5. Examples of suitable jointing compounds (depending on the particular application) include Vaseline®, fat, a polyurethane or silicon gel.

Figure 3:
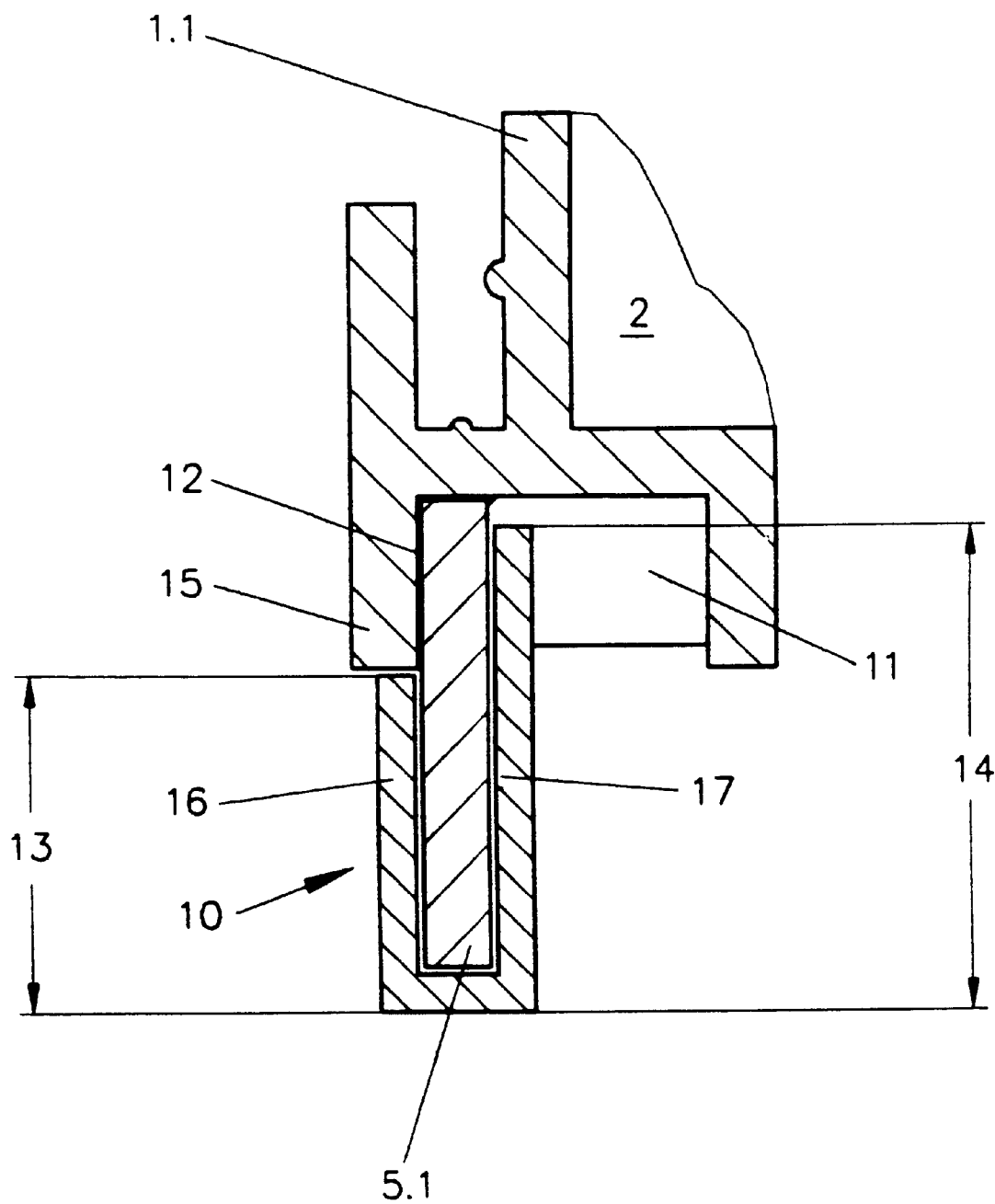
FIG. 3 shows an exemplary embodiment of a connecting corner piece according to FIG. 1 in cross section.

In FIG. 3, one of the connecting corner pieces 10 is shown in cross section. It can be discerned that connecting corner piece 10 has an essentially U-shaped profile, with outer leg 16 being shorter than inner leg 17. Connecting corner piece 10 is made of a polymer material. Legs 16 and 17, as a result of shrinkage, subject to production processes, contact each other with a degree of elastic prestressing at the sides facing each other.

Figure 4:
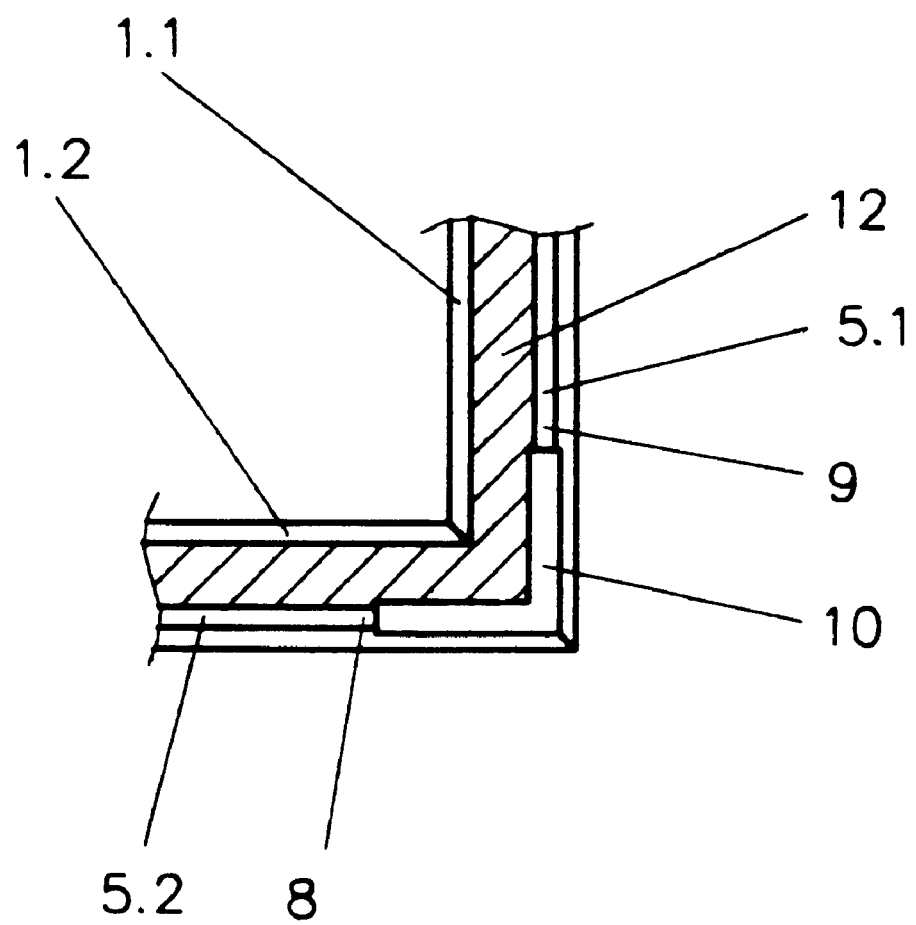
FIG. 4 provides an enlarged detail plan view of the connecting corner piece joining two tongue elements.

In FIG. 4, a cutaway enlargement plan view is shown. A connecting corner piece is placed onto tongue elements 5.1, 5.4., adjacent to each other. The shorter leg 16 rests on the outer boundary wall 15 of groove 11 and thus faces accordion fold pack 2; the shorter leg is designed to act as a limit stop for positioning tongue elements 5.1, 5.4 in groove 11 of frame element 1.1, 1.4. Longer leg 17 extends partially into groove 11 and is sealingly surrounded by molding compound 12 made of polyurethane.

What is claimed is:

1. A filter cartridge, comprising:
   an accordion filter pack having a circumferential side;
   a frame that sealingly surrounds the filter along the circumferential side of the filter, the frame being made of a plurality of assemblable, plate-shaped frame elements having upper and lower edges along at least one of which said edges protrudes a tongue element in the form of a strip-shaped element having ends;
   a lattice-shaped holder having a U-shape in profile that is configured to receive the tongue to allow the tongue to be affixed therein by a viscous jointing compound, wherein each tongue element is joined to a corresponding frame element, and adjacent ends of the tongue elements are sealingly fastened to each other by a connecting U-shaped corner piece having varying leg lengths, including a shorter leg and a facing parallel longer leg, the longer leg being located radially inwardly of the shorter leg.

2. A filter cartridge as set forth in claim 1, wherein the frame elements and the tongue elements are designed in one piece, integrally formed, and are made of the same material.

3. A filter cartridge as set forth in claim 1, wherein the tongue elements are produced separately from the frame elements and are sealingly joined to and edge of the frame elements.

4. A filter cartridge as set forth in claim 3, wherein an edge of the frame has an open groove opposite the accordion fold pack in which the tongue elements are sealingly received, the grooves containing a tough molding compound for binding the tongue elements.

5. A filter cartridge as set forth in claim 1, wherein the connecting corner pieces surround the tongue elements on the side of the tongue elements facing away from the frame elements.

6. A filter cartridge as set forth in claim 4, wherein the connecting comer pieces surround the tongue elements on the side of the tongue elements facing away from the frame elements.

7. A filter cartridge as set forth in claim 1, wherein the connecting corner pieces are made of polymer material and are filled at least partially with a jointing compound.

8. A filter cartridge as set forth in claim 4, wherein the connecting corner pieces are made of polymer material and are filled at least partially with a jointing compound.

9. A filter cartridge as set forth in claim 3, wherein the shorter leg rests on an outer boundary wall of the groove facing away from the accordion fold pack and acts as a limit stop for positioning the tongue element in the groove of the frame element, and the longer leg extends into the groove and is sealingly surrounded by the molding compound.

10. A filter cartridge as set forth in claim 5, wherein the shorter leg rests on an outer boundary wall of the groove facing away from the accordion fold pack and acts as a limit stop for positioning the tongue element in the groove of the frame element, and the longer leg extends into the groove and is sealingly surrounded by the molding compound.

11. A filter cartridge as set forth in claim 2, wherein the shorter leg rests on an outer boundary wall of the groove facing away from the accordion fold pack and acts as a limit stop for positioning the tongue element in the groove of the frame element, and the longer leg extends into the groove and is sealingly surrounded by the molding compound.

12. A filter cartridge as set forth in claim 1, wherein the tongue elements are contacted under elastic prestressing by the legs of the connecting corner pieces.

13. A filter cartridge as set forth in claim 1, wherein the tongue elements and the connecting corner pieces form a preassemblable unit.

14. A filter cartridge as set forth in claim 1, wherein the tongue elements are made of anodized aluminum.

* * * * *